United States Patent
Jaffe et al.

[11] 3,919,269
[45] Nov. 11, 1975

[54] ACYLATED PHENYLENE DIAMINES

[75] Inventors: Fred Jaffe, Ossinging, N.Y.; Arthur D. F. Toy, Stamford, Conn.

[73] Assignee: Stauffer Chemical Company, Westport, Conn.

[22] Filed: Dec. 17, 1971

[21] Appl. No.: 209,382

Related U.S. Application Data

[63] Continuation-in-part of Ser. No. 110,762, Jan. 28, 1971, abandoned.

[52] U.S. Cl. ....... 260/404.5; 260/558 P; 260/562 R; 260/465 D; 260/465.4; 260/471 R; 260/482 R; 260/558 A; 260/559 R; 260/562 N; 260/45.9 NC; 260/814; 252/401; 252/403; 44/71

[51] Int. Cl.² ............................. C07C 103/44
[58] Field of Search ............ 260/558, 562, 404.5

[56] References Cited
UNITED STATES PATENTS

| | | | |
|---|---|---|---|
| 3,035,014 | 5/1962 | Popoff et al. | 260/577 |
| 3,377,315 | 4/1968 | Ashton et al. | 260/562 |

FOREIGN PATENTS OR APPLICATIONS

| | | | |
|---|---|---|---|
| 1,096,433 | 12/1967 | United Kingdom | 260/574 |
| 1,145,740 | 3/1969 | United Kingdom | 260/562 |
| 1,463,732 | 11/1966 | France | 260/562 |
| 728,509 | 4/1955 | United Kingdom | 260/577 |
| 797,476 | 7/1958 | United Kingdom | 260/559 |

OTHER PUBLICATIONS

Welzel, Berichte, Vol. 103, pp. 1318–1333, (1970).
Dickey, Chem. Abst. Vol. 41, Col. 6283, (1947).
Saveleva et al., Chem. Abst., Vol. 74, Item 87018, (1971).
Smirnov et al. I, Chem. Abst., Vol. 61, Col. 14578, (1964).
Smirnov et al. II, Chem. Abst., Vol. 62, Col. 3910, (1965).
Tzmailskii et al., Chem. Abst., Vol. 31, Col. 4286, (1937).
Subject Index, Chem. Abstr., Vol. 50, pp. 304s–305s, (1956).

*Primary Examiner*—Harry I. Moatz
*Attorney, Agent, or Firm*—Charles B. Rodman; John L. Callahan; Daniel S. Ortiz

[57] ABSTRACT

Novel mono-acylated phenylene diamines of the formula:

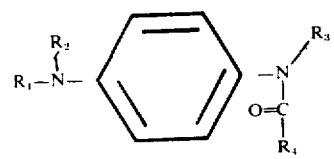

wherein $R_1$ and $R_3$ can each be alkyl, cycloalkyl, aryl, aralkyl or alkaryl; $R_2$ can be hydrogen, alkyl, cycloalkyl, aryl, aralkyl or alkaryl; and $R_4$ can be hydrogen, alkyl, phenyl, substituted alkyl or substituted phenyl; are prepared by acylating a phenylene diamine of the formula:

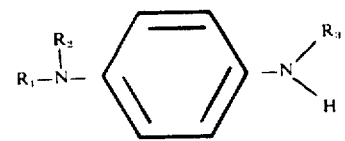

wherein $R_1$, $R_2$ and $R_3$ are as previously designated.

These compounds show superior and unexpected high temperature antioxidant and fluid stabilization properties when incorporated into polycarboxylate functional fluids. They are also suitable as antioxidants in gasoline and automotive lubricating oils and in rubber.

5 Claims, No Drawings

ACYLATED PHENYLENE DIAMINES

RELATED APPLICATION

This application is a continuation-in-part of application Ser. No. 110,762 filed Jan. 28, 1971, by Fred Jaffe and Arthur D. F. Toy and now abandoned.

BACKGROUND OF THE INVENTION

The use of aryl amines as antioxidants for synthetic ester functional fluids is well known in the art. Thus, the secondary aryl amines such as the phenyl naphthyl amines, the diphenyl amines and the like have been found to decrease the amount of sludge buildup in the fluid. Unfortunately, these materials have proven unsatisfactory in stabilizing the fluids against changes in viscosity and acid number; problems which can be very detrimental to the high temperature performance needed in modern jet engines. Hindered phenolic type compounds, including phenolic amine compounds of the type disclosed in British Patent No. 1,096,433, have been used as antioxidants but these materials tend to be corrosive. British Patent No. 1,145,740 has suggested acylating the phenolic amines of British 1,096,433 to give better corrosion characteristics in hydrocarbon oil and dicarboxylate type fluids. None of these materials, however, have adequately solved the problems of acid buildup and viscosity change mentioned above.

It is, therefore, an object of the present invention to provide antioxidants which will stabilize polycarboxylate type esters against changes in acid number and viscosity.

It is an additional object of the present invention to provide antioxidants which will stabilize gasoline and petroleum oils and rubber against oxidative degradation. Still further objects will be apparent from the disclosure contained hereinafter.

DETAILED DESCRIPTION OF THE INVENTION

The present invention relates to novel high temperature antioxidants for polycarboxylate functional fluids. The present invention also relates to antioxidants for gasoline and petroleum oils. More particularly the present invention relates to antioxidants obtained by acylating a phenylene diamine compound.

The antioxidants of the present invention have a formula corresponding to:

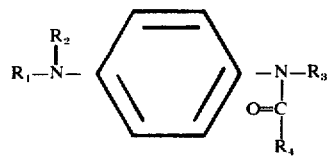

wherein $R_1$ and $R_3$ can each be alkyl, cycloalkyl, aryl, aralkyl or alkaryl; $R_2$ can be hydrogen, alkyl, cycloalkyl, aryl, aralkyl or alkaryl; and $R_4$ can be hydrogen, alkyl, phenyl, substituted alkyl or substituted phenyl. In the preferred embodiment of the present invention $R_1$ and $R_3$ can each be a $C_1$-$C_{20}$ alkyl, a $C_5$-$C_{18}$ cycloalkyl, phenyl, alkylphenyl, naphthyl or alkylnaphthyl; $R_2$ is hydrogen and $R_4$ is $C_1$-$C_{20}$ alkyl, phenyl, substituted alkyl or substituted phenyl. Particularly preferred compounds of the present invention are the acylated derivatives of N,N'-di-sec-butyl-p-phenylene diamine having the formula:

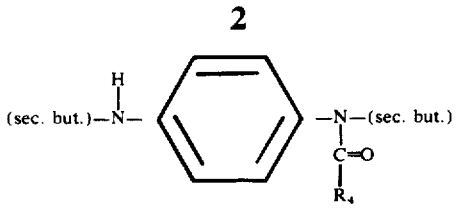

wherein sec. but. is a secondary butyl group and $R_4$ is $C_1$-$C_{20}$ alkyl or phenyl. The terms substituted alkyl and substituted phenyl as used herein are meant to designate an alkyl or phenyl groups having attached thereto at least one substituent of the type: halogen, cyano, carboxyl, carboxylate, amido, amino, nitro, hydroxy or alkoxy. Illustrative of these compounds are the following:

N-heptanoyl-N,N'-di-sec-butyl-p-phenylene diamine;
N-hexanoyl-N,N'-di-sec-butyl-p-phenylene diamine;
N-benzoyl-N,N'-di-sec-butyl-p-phenylene diamine;
N-heptanoyl-N,N'-bis(3,5-dimethylheptyl)-p-phenylene diamine;
N-heptanoyl-N,N'-bis(1,4-dimethylpentyl)-p-phenylene diamine;
N-acetyl-N,N'-di-sec-butyl-p-phenylene diamine;
N-stearoyl-N,N'-di-sec-butyl-p-phenylene diamine;
N'-heptanoyl-N-phenyl-N'-(1,3-dimethylbutyl)-p-phenylene diamine; and the like.

These antioxidants are prepared by acylating a phenylene diamine of the formula:

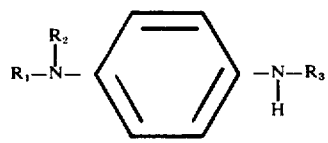

wherein $R_1$, $R_2$ and $R_3$ are as designated above. This acylation can be carried out according to any of the well known acylation reactions. Thus, the phenylene diamine can be reacted with a carboxylic acid of the formula

at an elevated temperature, normally in the range from about 100° to about 300° C. Alternately, the phenylene diamine can be reacted with an acid anhydride of the formula:

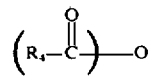

at a temperature in the range of from about 20° to about 200° C. The third method involves reacting the phenylene diamine with an acid chloride of the formula

at a temperature in the range of from about 20° to about 150° C. When employing the second and third route, an acid acceptor such as a tertiary amine can be employed to improve the yield and prevent side reactions. Pyridine appears to be particularly suitable for this purpose although any of the art recognized acid acceptors can be employed.

The antioxidants of the present invention are employed in functional fluids of the polycarboxylate type. The term "polycarboxylate" as used herein is meant to designate those materials having between 2 and 8 carboxylate groups per molecule. These materials are well known in the lubrication art and can be prepared by reacting a polycarboxylic acid with a mono-hydric alcohol or, alternatively, reacting a mono-carboxylic acid with a polyhydric alcohol. Illustrative of the base stock materials which can be employed in the present invention are the following: dicarboxylates such as oxalates, malonates, succinates, glutarates, adipates, pimelates, suberates, azelates, sebacates and the like; tricarboxylates such as triesters of trimethylolpropane and tricarboxypentane; tetracarboxylates such as the tetraesters of pentaerythritol; and the higher polycarboxylates such as the esters of di- and tri-pentaerythritol. Mixtures of these esters can also be employed. When a polycarboxylic acid is used to make the polycarboxylate, the alcohol moiety of these esters normally has between 4 and 18 carbon atoms and preferably from 6 to 12 carbon atoms. Likewise, when a poly-hydric alcohol is used to make the polycarboxylate, the carboxylic moiety normally has from 4 to 18 carbon atoms and preferably from 4 to 12 carbon atoms. Mixtures of the above described esters can also be used. The preferred base stocks are of the trimethylolpropane and pentaerythritol ester type. Particularly preferred is a mixture of trimethylolpropane triheptanoate and pentaerythritol monobutyrate triheptanoate. These esters can also be crosslinked by employing a crosslinking agent such as azelaic acid when synthesizing them as is well known in the art.

The antioxidants of the present invention are present in an amount sufficient to stabilize the fluid at high temperatures against oxidation, and in particular to stabilize it against acid number change, viscosity change and the like. This amount will vary depending upon the operating conditions to which the fluid will be subjected. Normally, to operate at temperatures above 300° F. the amount necessary will be in the range of from about 0.01% to about 10 by weight and preferably from about 0.5% to about 5% by weight is employed. These percentage ranges are based on the weight of the entire fluid formulation.

The base stocks into which the present antioxidants are incorporated can also contain other well known functional fluid additives. Typical of these are the following, with the normal ranges in weight percent of the entire fluid being given in the parenthesis:

a. viscosity index improvers such as the polymers of acrylic and methacrylic acid esters which are normally incorporated in a suitable carrier (0.5–5%);

b. lubricity and extreme pressure additives of the organo phosphorus type, particularly the organic phosphites, phosphonates, phosphates, and amine salts thereof, as exemplified by the hydrogen phosphonates, triaryl phosphates and the amine salts of dialkyl phosphorus acid esters (0.01–5%);

c. metal deactivators such as benzotriazoles and the N,N'-disalicylidene-dialkyl diamines (0.001–1%); and d. antifoaming agents of the silicone variety, particularly the methyl silicones and siloxanes (0.0001% to 0.002%).

The antioxidants of the present invention can also be used in combination with other well known antioxidants to yield very stable fluids. In particular, it has been found to be desirable to employ the compounds of the present invention in combination with antioxidants of the secondary aryl amine type such as the phenyl naphthyl amines, the alkylphenyl naphthyl amines, particularly octylphenyl naphthyl amines and the diphenyl amines, particularly p,p'-dioctyldiphenyl amine. These antioxidants can be employed in amounts from about 0.01% to about 10% by weight of the entire fluid. They are preferably present in a weight ratio to the antioxidants of the present invention of from about 3:1 to about 0.3:1.

The antioxidants of the present invention are also suitable for stabilizing gasoline and petroleum oils against oxidative degradation. This is of particular importance in the automotive industry, where gum buildup caused by oxidation can seriously effect the performance of the engine. Normally petroleum oils can be stabilized by adding thereto the antioxidants of the present invention in amounts from about 0.1 to 10% by weight of the entire formulation and preferably from about 0.5 to 5% by weight. When used to stabilize gasoline, the antioxidants of the present invention should normally be used in amounts from about 10 to about 500 parts per million by weight.

The present invention will be further illustrated by the following examples.

EXAMPLE 1

A 2 liter flask, fitted with a reflux condenser to which a water trap is attached, is charged with 200 milliliters of toluene, 110.2 grams of N,N'-di-sec-butyl-p-phenylene diamine and 65.1 grams of heptanoic acid. The flask is heated to reflux and maintained at a pot temperature of about 275° C. until 9 milliliters of water is formed. The condenser is removed and volatiles are driven off by maintaining the pot temperature at 230° C. The final product weighs 123 grams and is identified by I.R. spectra, gas chromatography and N.M.R. to be N-heptanoly-N,N'-di-sec-butyl-p-phenylene diamine.

EXAMPLE 2

The procedure of Example 1 is followed except that 133 grams of N-cyclohexyl-N'-phenyl-p-phenylene diamine is substituted for the N,N'-di-sec-butyl-p-phenylene diamine. The resulting product is shown by I.R., gas chromatograph and N.M.R. analysis to be N-heptanoyl-N-cyclohexyl-N'-phenyl-p-phenylene diamine.

EXAMPLE 3

The procedure of Example 1 is followed except that 152 grams of N,N'-bis(1,4-dimethylpentyl)-p-phenylene diamine is employed as the phenylene diamine. The product is shown by I.R., gas chromatography and N.M.R. analysis to be N-heptanoyl-N,N'-bis-(1,4-dimethylpentyl)-p-phenylene diamine.

EXAMPLE 4

The products of Examples 1, 2 and 3 are formulated in quantities of 2% by weight with a fluid comprising 77.98% pentaerythritol monobutyrate triheptanoate crosslinked with azelaic acid, 19.89% trimethylolpropane triheptanoate, 0.50% tricresyl phosphate and 0.02% benzotriazole. The unacylated compound N,N'-bis(1,4-dimethylpentyl)-p-phenylene diamine used to make the compound of Example 3 is also formulated with this basestock as a control. These fluids are then tested according to a 400° F. oxidation test, Fed. Std. 791A Method 5308.4. The results of these tests are contained in Table I.

TABLE I

| Antioxidant | Acid No. Change (mg KOH/gm) | Viscosity Change (%) | Metal Weight Changes (mg/cm²) | | | | | Filter Deposits |
|---|---|---|---|---|---|---|---|---|
| | | | Mg | Al | Steel | Ag | Cu | |
| N-heptanoyl-N,N'-di-sec-butyl-p-phenylene diamine | +1.02 | +15.8 | 0.04 | 0.08 | 0.06 | 0.07 | 0.07 | Moderate |
| N-heptanoyl-N,-cyclohexyl-N-phenyl-p-phenylene diamine | +1.59 | +18.2 | +0.06 | 0.28 | 0.17 | 0.26 | 0.22 | Moderate |
| N-heptanoyl-N,N'-bis(1,4-dimethylpentyl)-p-phenylene diamine | +4.92 | +26.9 | +1.65 | −0.07 | +0.06 | +0.07 | −0.07 | Small |
| N,N'-bis(1,4-dimethylpentyl)-p-phenylene diamine | +6.94 | +46.7 | +0.16 | +0.40 | +0.30 | +0.44 | +0.70 | Heavy |

The results contained in Table I clearly demonstrate the unusual and beneficial properties of the compounds of the present invention.

EXAMPLE 5

The product of Example 1 and the unacylated starting material of Example 1 are formulated in quantities of 2% by weight with a fluid comprising 77.98% pentaerythritol monobutyrate triheptanoate crosslinked with azelaic acid, 19.50% trimethylolpropane triheptanoate, 0.5% tricresyl phosphate and 0.02% benzotriazole. The two fluids are then tested according to Naval Air Systems Command Experimental Specification XAS 2354. The results are contained in Table II.

TABLE II

| Compound | Viscosity Change at 100° F. % | Acid No. Change mg KOH/g | Metal Corrosion Wt. Change (mg/cm₂) | | | | Appearance |
|---|---|---|---|---|---|---|---|
| | | | Steel | Ag | Al | Ti | |
| N-heptanoyl-N,N'-di-sec-butyl-p-phenylene diamine | +39.0 | +8.60 | 0.077 | 0.163 | 0.035 | 0.017 | Clean |
| N,-N'-di-sec-butyl-p-phenylenediamine | +63.3 | +6.64 | 0.197 | 0.111 | 0.223 | 0.235 | Heavy Sediment |

The results in Table II, like those in Table I, show the superiority of the mono-acylated compounds of the present invention to the unacylated material.

EXAMPLE 6

The product of Example 1 is blended with the functional fluid of Table III to yield the formulation of Table III. The two fluids are tested according to the Alcor Deposition test, as outlined in the "Proceedings of the United States Air Force Southwest Research Institute - Turbine Engine Lubrication Conference" of September 13-15, 1966.

TABLE III

| Blend | | |
|---|---|---|
| Trimethylolpropane Triheptanoate | 97.85 | 96.85 |
| Phenyl-α-naphthylamine | 1.15 | 1.15 |
| Dioctyl Diphenyl Amine | 1.00 | 1.00 |
| N-heptanoyl-N,N'-di-secondary butyl- | | |

TABLE III-continued

| p-phenylene diamine | — | 1.00 |
|---|---|---|
| Alcor Deposition Test Overall Demerit Rating | 91 | 17.4 |
| Critical Temperature, ° F. | 545 | 580 |
| Tube Deposits, mg | 171 | 5.9 |
| Filter Deposits, mg | 1.7 | 3.9 |
| Viscosity Change, % | +25.4 | +9.2 |
| Acid Number Change, mg KOH/g | +4.08 | +0.80 |

The results contained in Table III demonstrate that the formulation containing the present antioxidants is vastly superior in every category except that of filter deposits where it is comparable and well within normal tolerances.

EXAMPLE 7

To a three necked flask, fitted with an additional funnel, thermometer, stirrer and condenser, there is charged 100 ml. toluene and 110.2 g (0.5 moles) of N,N'-di-sec-butyl-p-phenylene diamine, 51.05 g (0.5 moles) of acetic anhydride is then added dropwise. Upon completion of the addition of acetic acid, the reactant mixture is refluxed at 123° C for 2 hours. The reactant mixture is then cooled, washed with 250 ml. of 5% sodium hydroxide solution and stripped. 125 g (95.5% yield) of a viscous organge brown oil having a boiling point of 175°–180° C/0.29 mm. is obtained. I.R. spectra, gas chromatography and N.M.R. show the product to be N-acetyl-N,N'-di-sec-butyl-p-phenylene diamine.

EXAMPLE 8

The procedure of Example 7 is followed with the exception that 61 g (0.5 moles) of benzoic acid and 150 ml of V.M. and P Naphtha are substituted for the acetic acid and toluene respectively. The reactant mixture is refluxed at 270°–305° C for 5 hours. The product, a viscous orange oil is then distilled at 210°–225° C/0.3 mm. which crystallizes upon cooling. Recrystallization with benzene and pentane gives a 63% yield of a solid having a melting point of 85°–86° C. Analysis shows this product to be N-benzoyl-N,N'-di-sec-butyl-p-phenylene diamine.

EXAMPLE 9

To the apparatus of Example 7 there is charged 44.0 g (0.2 moles) of N,N'-di-sec-butyl-p-phenylene diamine, 22.4 of g triethyl amine and 100 ml. of benzene. 60.6 g (0.2 moles) of stearoyl chloride is then added dropwise and the temperature of the reactant mixture rises to 85° C. Upon completion of the addition of the stearoyl chloride, 100 ml. of benzene is added and the mixture is refluxed at 88° C. for 30 minutes. The product is then cooled, filtered, washed and stripped. Distillation at 220°–280° C/0.05–0.18 mm. gives a brown oil which turns to a waxy solid upon standing. The product yield is 46% and the analysis shows it to be N-stearoyl-N,N'-di-sec-butyl-p-phenylene diamine.

What is claimed is:

1. A mono-acylated phenylene diamine of the formula:

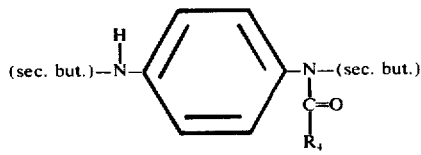

wherein sec. but. is a secondary butyl group and $R_4$ is $C_1$–$C_{20}$ alkyl or phenyl.

2. N-heptanoyl-N,N'-di-sec-butyl-p-phenylene diamine.
3. N-acetyl-N,N'-di-sec-butyl-p-phenylene diamine.
4. N-stearoyl-N,N'-di-sec-butyl-p-phenylene diamine.
5. N-benzoyl-N,N'-di-sec-butyl-p-phenylene diamine.

* * * * *

UNITED STATES PATENT AND TRADEMARK OFFICE
CERTIFICATE OF CORRECTION

PATENT NO. : 3,919,269
DATED : November 11, 1975
INVENTOR(S) : Fred Jaffe et al

It is certified that error appears in the above-identified patent and that said Letters Patent are hereby corrected as shown below:

Column 2, 4th diagram, reads $$" \quad (R_4-C)-O \quad "$$
$$\phantom{"\quad}\overset{\overset{O}{\|}}{}$$

should read $$-- (R_4-\overset{\overset{O}{\|}}{C})_{2}-O --$$

Signed and Sealed this

Nineteenth Day of October 1976

[SEAL]

Attest:

RUTH C. MASON
*Attesting Officer*

C. MARSHALL DANN
*Commissioner of Patents and Trademarks*